US007200567B2

(12) United States Patent
Caci et al.

(10) Patent No.: US 7,200,567 B2
(45) Date of Patent: Apr. 3, 2007

(54) PURCHASING AID LOGISTICS APPLIANCE AND METHOD FOR USE

(75) Inventors: Joseph Claude Caci, Owego, NY (US); Gregory D. Scanlon, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 20 days.

(21) Appl. No.: 10/037,382

(22) Filed: Jan. 4, 2002

(65) Prior Publication Data

US 2003/0130909 A1 Jul. 10, 2003

(51) Int. Cl.
*G06Q 30/00* (2006.01)
(52) U.S. Cl. ............................. 705/26; 705/1; 705/27; 235/472.01; 235/472.02; 235/472.03; 235/383
(58) Field of Classification Search ................... 705/14, 705/26, 27, 1; 235/472.01, 472.02, 472.03, 235/383
See application file for complete search history.

(56) References Cited

U.S. PATENT DOCUMENTS

| 4,975,926 | A |   | 12/1990 | Knapp ........................ 375/141 |
| 4,992,940 | A |   | 2/1991  | Dworkin ..................... 364/401 |
| 5,025,486 | A | * | 6/1991  | Klughart ..................... 340/3.1 |
| 5,047,614 | A |   | 9/1991  | Blanco ........................ 235/385 |
| 5,067,104 | A |   | 11/1991 | Krishnakumar et al. .... 712/226 |
| 5,250,789 | A |   | 10/1993 | Johnsen ....................... 235/383 |
| 5,295,064 | A |   | 3/1994  | Malec et al. ................ 364/401 |
| 5,321,542 | A |   | 6/1994  | Freitas et al. ............... 398/127 |
| 5,424,524 | A | * | 6/1995  | Ruppert et al. ................ 705/8 |
| 5,469,206 | A |   | 11/1995 | Strubbe et al. ................ 348/7 |
| 5,611,051 | A |   | 3/1997  | Pirelli ........................ 395/210 |
| 5,664,110 | A | * | 9/1997  | Green et al. .................. 705/26 |
| 5,701,491 | A |   | 12/1997 | Dunn et al. .................. 717/167 |
| 5,825,002 | A |   | 10/1998 | Roslak ........................ 235/375 |
| 5,831,664 | A |   | 11/1998 | Wharton et al. ............. 725/81 |

(Continued)

FOREIGN PATENT DOCUMENTS

DE 19718 904 A 12/1998

(Continued)

OTHER PUBLICATIONS

Qode Selected Best of Show At Fall Internet World Conference-Commerce-Enabling Company Wins "Best of Show" in Internet Client Device Category with its Bar-code enabler for E-commerce, Business Wire, Oct. 27, 2000.*

(Continued)

*Primary Examiner*—Jeffrey A. Smith
*Assistant Examiner*—Michael A. Misiaszek
(74) *Attorney, Agent, or Firm*—Burns & Levinson LLP; Jacob N. Erlich; Kathleen Chapman

(57) ABSTRACT

A purchasing aid logistics appliance that assists a purchaser with a shopping list generation, in-store product location, automated checkout, and financial management. The PAL is in the form of a battery operated PAL with touch screen display and multimedia input/output. The PAL functions as a fiduciary aid and two-way communications device secure for managing money and processing perishable data. The PAL can function as a stand-alone device or synchronized with a user's personal computer via a RF or IR 1ink.

12 Claims, 17 Drawing Sheets

U.S. PATENT DOCUMENTS

| | | | |
|---|---|---|---|
| 5,832,296 A | 11/1998 | Wang et al. | 710/3 |
| 5,845,282 A | 12/1998 | Alley et al. | 707/10 |
| 5,850,433 A | 12/1998 | Rondeau | 379/201 |
| 5,857,201 A | 1/1999 | Wright, Jr. et al. | 707/104.1 |
| 5,873,045 A | 2/1999 | Lee et al. | 455/550 |
| 5,884,215 A | 3/1999 | Birchler et al. | 701/207 |
| 5,897,622 A | 4/1999 | Blinn et al. | 705/26 |
| 5,915,019 A * | 6/1999 | Ginter et al. | 705/54 |
| 5,923,735 A * | 7/1999 | Swartz et al. | 379/93.12 |
| 5,950,173 A | 9/1999 | Perkowski | 705/26 |
| 5,956,693 A | 9/1999 | Geerlings | 705/14 |
| 5,966,225 A | 10/1999 | Taglione et al. | 398/96 |
| 5,969,678 A | 10/1999 | Stewart | 342/457 |
| 5,971,277 A | 10/1999 | Cragun et al. | 235/462.01 |
| 5,974,547 A | 10/1999 | Klimenko | 713/2 |
| 5,979,757 A | 11/1999 | Tracy et al. | 235/383 |
| 5,982,520 A | 11/1999 | Weiser et al. | 398/126 |
| 6,012,049 A * | 1/2000 | Kawan | 705/41 |
| 6,038,551 A | 3/2000 | Barlow et al. | 705/41 |
| 6,061,057 A | 5/2000 | Knowlton et al. | 715/744 |
| 6,064,979 A | 5/2000 | Perkowski | 705/26 |
| 6,073,112 A | 6/2000 | Geerlings | 705/14 |
| 6,073,842 A | 6/2000 | Yoshinaga | 235/382.5 |
| 6,078,806 A | 6/2000 | Heinonen et al. | 455/406 |
| 6,085,030 A | 7/2000 | Whitehead et al. | 709/203 |
| 6,092,053 A | 7/2000 | Boesch et al. | 705/26 |
| 6,094,724 A | 7/2000 | Benhammou et al. | 713/202 |
| 6,101,483 A * | 8/2000 | Petrovich et al. | 705/26 |
| 6,101,486 A | 8/2000 | Roberts et al. | 705/27 |
| 6,106,570 A | 8/2000 | Mizuhara | 717/169 |
| 6,108,703 A | 8/2000 | Leighton et al. | 709/226 |
| 6,119,935 A | 9/2000 | Jelen et al. | 235/383 |
| 6,123,259 A | 9/2000 | Ogasawara | 235/380 |
| 6,125,352 A | 9/2000 | Franklin et al. | 705/26 |
| 6,129,276 A | 10/2000 | Jelen et al. | 235/383 |
| 6,185,541 B1 * | 2/2001 | Scroggie et al. | 705/14 |
| 6,189,781 B1 | 2/2001 | Yoshinaga et al. | 235/375 |
| 6,199,753 B1 | 3/2001 | Tracy et al. | 235/375 |
| 6,272,575 B1 | 8/2001 | Rajchel | 710/301 |
| 6,278,499 B1 | 8/2001 | Darbee et al. | 348/734 |
| 6,292,283 B1 | 9/2001 | Grandbois | 398/107 |
| 6,311,167 B1 | 10/2001 | Davis et al. | 705/35 |
| 6,314,406 B1 * | 11/2001 | O'Hagan et al. | 705/14 |
| 6,381,465 B1 | 4/2002 | Chern et al. | 455/466 |
| 6,397,057 B1 | 5/2002 | Malackowski et al. | 455/414.1 |
| 6,505,046 B1 | 1/2003 | Baker | 455/456.3 |
| 6,568,596 B1 * | 5/2003 | Shaw | 235/462.01 |
| 6,587,835 B1 | 7/2003 | Treyz et al. | 705/14 |
| 6,601,038 B1 | 7/2003 | Kolls | 704/14 |
| 6,602,469 B1 * | 8/2003 | Maus et al. | 422/68.1 |
| 6,629,151 B1 | 9/2003 | Bahl | 709/250 |
| 6,643,510 B2 | 11/2003 | Taylor | 455/431 |
| 6,643,650 B1 | 11/2003 | Slaughter et al. | 707/10 |
| 6,647,269 B2 | 11/2003 | Hendry et al. | 455/456.3 |
| 6,684,399 B1 | 1/2004 | Grooters | 725/48 |
| 6,738,951 B1 | 5/2004 | Weiss et al. | 715/523 |
| 6,760,916 B2 | 7/2004 | Holtz et al. | 725/34 |
| 6,785,902 B1 | 8/2004 | Zigmond et al. | 725/38 |
| 6,857,021 B1 | 2/2005 | Schuster et al. | 709/227 |
| 6,966,027 B1 | 11/2005 | Krasinski | 715/513 |
| 2001/0049636 A1 * | 12/2001 | Hudda et al. | 705/26 |
| 2001/0054114 A1 | 12/2001 | DuVal et al. | 709/247 |
| 2002/0006788 A1 | 1/2002 | Knutsson et al. | 455/422 |
| 2002/0019782 A1 * | 2/2002 | Hershtik | 705/26 |
| 2002/0022994 A1 * | 2/2002 | Miller et al. | 705/14 |
| 2002/0052781 A1 | 5/2002 | Aufricht et al. | 705/14 |
| 2002/0055924 A1 | 5/2002 | Liming | 707/100 |
| 2002/0104087 A1 | 8/2002 | Schaffer et al. | 725/46 |

FOREIGN PATENT DOCUMENTS

| | | | |
|---|---|---|---|
| EP | 0552861 A2 | | 7/1993 |
| WO | WO 01/20526 | * | 3/2001 |
| WO | WO 02/15438 A1 | | 2/2002 |

OTHER PUBLICATIONS

WO 98/18094, "Personal Shopping System", Publication Date: Apr. 30, 1998.

WO 01/20526, "Shopping List Organizer Apparatus and Method", Publication Date: Mar. 22, 2001, Application Filing Date: Sep. 14, 2000.

EP 0 837 406 A, "Data Retrieval System and Method", Publication Date: Apr. 22, 1998.

* cited by examiner

| Code Description | Item 401 Code Value | Code Description | Action | Result |
|---|---|---|---|---|
| Illegal Value | 00-09 | Not Allowed Belongs to Item 102 | Break | Reset or Set or Exception |
| Begin Code | 11 | Indicates the start of data | Item 103 Property | none |
| Table Pointer | 12-19 | Eight values to point to 8 possible tables Items 105,106,107,111 | Engage a Decode Table | Select Table and Create Display or Build Rule |
| Checksum | 21 | Indicates next field is a checksum | Compare with locally generated checksum | Valid scan or non-valid scan |
| Checksum size | 00-99 | Value of checksum can only follow code 20 | Data value | none |
| Code Count Value | 02-64 | Tells parser to create N code statements Can only follow table pointer | Indicates number of statements | Number of code statements to build and structure check |
| Table Index Start | 22 | Tells Parser to expect Table Index Code | Delimiter | Table Index Code To Follow |
| Table Index Code | 00-99 | Can only follow code 22 | Points to statement in table | Extracts code statement and number of fields |
| Text length code | 31 | Indicates the next value is the size of a text field | Prepare to extract text count | Reads text length |
| Text length | 00-99 | Number of text characters to follow | Sets counter | Count characters |
| Text | 31-56 | A-Z | Data | Populate code with alphabet data |
| Text | 57-66 | 0-9 | Data | Populate code with digit data |
| Text Punctuation | 67-75 | .,?+-@$#'space' | Data | Populate code with punctuation data |
| Table Index End | 23 | End of Table Index | Closes out Table | Ends Table Process |
| End Code | 91 | Indicates End of data | Closes out item 103 | Ends Scanning |
|  |  |  |  |  |
| Additional Codes | 99 | Available | .. | .. |

FIG. 5

PURCHASING AID LOGISTICS APPLIANCE AND METHOD FOR USE

BACKGROUND OF THE INVENTION

This invention relates generally to electronic commerce, and, more particularly, to the processing, modifying, analyzing, and storing of purchaser data to support functions that are valuable to product identification, selection, and purchase for the customer, the merchant, and the supply chain.

The retail industry's drive for efficiency is on going. Purchasers favor merchants with lowest prices. Merchants compete to provide lowest prices. In this competition unit stores are growing ever-larger floor and shelf space and carrying more stock. Managing very large stock, floor and shelf spaces is becoming difficult. Purchasers need assistance to manage the volume and frequency of product and sales information; navigate in large retail spaces to find specific products; provide electronic payment for product purchases.

Merchants, suppliers and purchasers (customers) are beginning to work together. Merchants and suppliers now provide information through the Internet so purchasers can shop from home. Merchants and suppliers are providing barcode coupons through the Internet. Purchasers are beginning to use portable barcode scanner devices supplied by merchants to select and process products in the retail space. Merchants have deployed kiosks in the retail space with electronic displays and keyboards to display information about products to purchasers. Paper catalogs now appear with barcodes that direct a web browser to a product information page on the Internet. Electronic devices are now available to help a purchaser manage money and automate the payment function of the checkout process.

Financial transactions require encryption to keep sensitive data secure. Communications encryption is accomplished today using the Public Key Infrastructure or PKI. This method is safe and secure as long as the key is safe and secure. If someone steals a laptop computer, the key is stored in the computer and it is compromised. In the prior art, the public key is offloaded from the laptop computer to a smartcard. The smartcard must be inserted to make a secure connection. However the memory of the laptop computer is still unprotected leaving stored data susceptible to theft.

Examples of systems in place today to accommodate purchasers are described in U.S. Pat. No. 5,873,045 to Peter Lee et al that describes a mobile client system using a cellphone interconnected with a mobile computing device; and U.S. Pat. No. 5,956,693 that describes merchant communication to customers. Both of these devices place mobile computer power in the hands of the purchaser. These devices advance purchaser or customer automation by providing access to product data in the retail space. But neither is designed to be ubiquitously integrated into a merchants retail automation system. Both of these devices are insufficient to support all the functions needed by the merchant, supplier and purchaser (customer).

For a better understanding of the present invention, reference is made to the accompanying drawings and detailed description and its scope will be pointed out in the appended claims.

SUMMARY OF THE INVENTION

The present invention is a purchasing aid logistics appliance (PAL) is stand alone device that communicates with a merchant computer providing communication between a PAL and the merchant in-store computer. Sensitive personal finance, product, price and availability information can be exchanged between the PAL and the merchant computer in a secure timely manner to specific identifiable purchasers and to the general public. The PAL will assist the purchaser in product selection and location; merchant selection and management; automated checkout; and managing financial data. In addition, the PAL interfaces with a merchants in-store system to communicate to the purchaser in the retail space. The PAL communicates using both data and voice using an unrestricted part of the spectrum. The PAL interfaces with a network outside the retail space to gather product information in preparation for future visits to the merchant store. Further, the PAL interacts securely in the retail space with the merchants automation system to assist the purchaser with product selection, location and checkout.

BRIEF DESCRIPTION OF THE DRAWINGS

FIG. 5 is a tabular representation of an example of a vertical barcode numerical code pattern for a high-density barcode used with this invention;

DETAILED DESCRIPTION OF THE PREFERRED EMBODIMENTS

Figure 1:
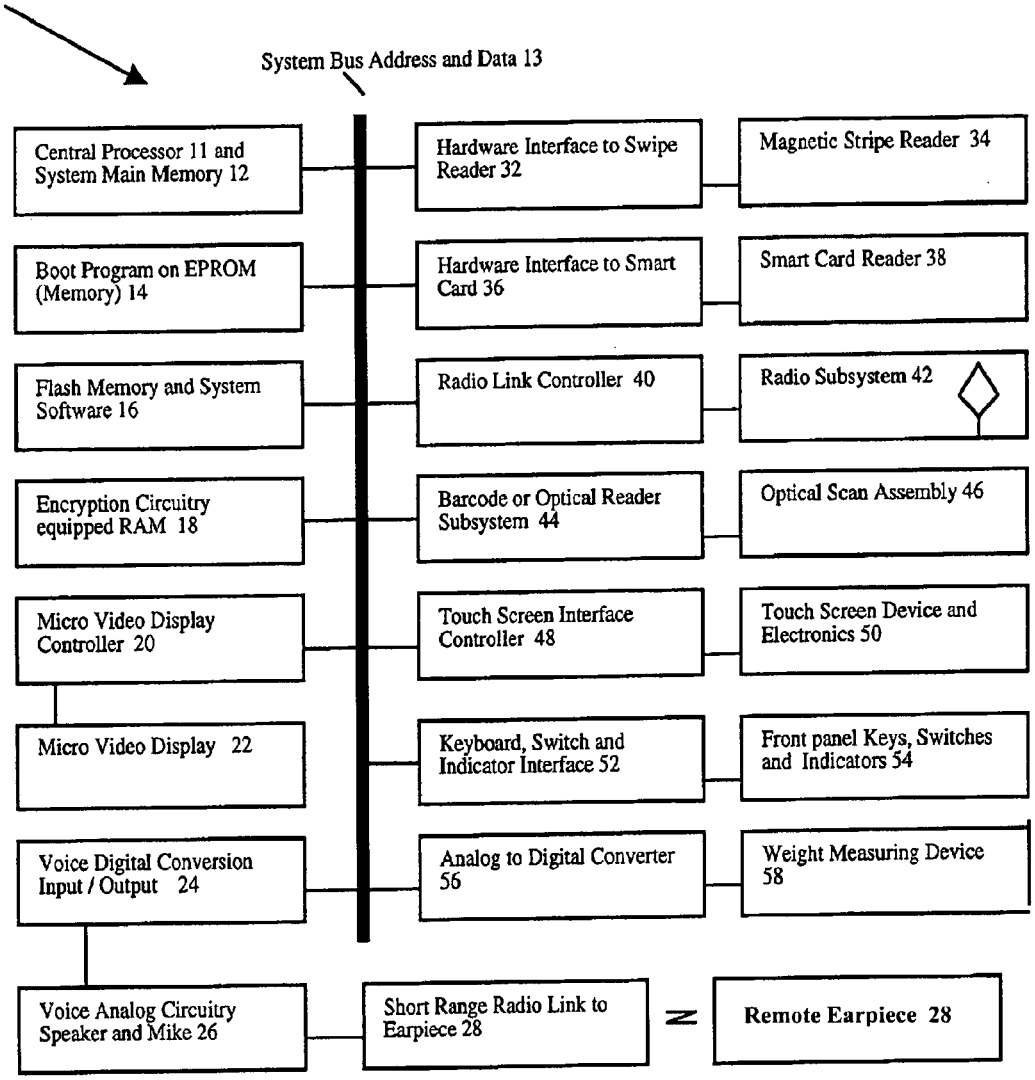
FIG. 1 is a block diagram of the PAL computer hardware architecture of this invention.

The preferred embodiment of the present invention is represented by a purchasing aid logistics (PAL) appliance 10. The PAL 10 utilizes conventional components in the hardware architecture as shown in FIG. 1. These components described below are not to be considered as a limitation on the present invention and can be substituted for by other equivalent components.

A central processor 11 with main memory 12 connected to a main system address/data bus 13 links all the components of the hardware architecture. A secure trusted monitor program stored in the main memory 12 and executable by the central processor 11 controls all functions. A Boot Program 14 brings up the PAL 10 from a cold or warm start and runs test executables. The monitor program is stored in Flash Memory and System Software 16 where it can be updated as needed. Key session parameters have been stored from a previous use. Secure data such as encryption keys, financial data, owner name and pertinent data are stored in an encryption circuitry equipped random access memory 18. There is a micro video display controller 20 for a micro video display 22. Conventional voice analog circuitry 26 with speaker and microphone is utilized for voice digital conversion input/output 24. The monitor program stores specific voice samples for necessary biometric voice recognition. Additionally, the PAL 10 includes a barcode or optical reader subsystem 44 and optical scan assembly 46, magnetic stripe reader 34 utilizing a hardware interface 32 to the system bus 13, smart card reader 38 utilizing a hardware interface 36, remote ear piece 28, high-resolution touch screen display 50 with touch screen interface controller 48, weight-measuring device 58 connected to the bus 13 by an analog-to-digital converter 56, a radio link controller 40 and radio subsystem 42 for high-speed secure short-range communication. Additionally, the PAL 10 includes a front panel 54 that includes keys, switches and indicators coupled to the bus 13 by a panel interface 52. As stated above, this listing of features is for illustrative purposes and not to limit the invention. Other features not listed are within the contemplation of the invention.

The PAL 10 can execute several program modules stored on the central processor 11, such as accounting, calendar, clock, shopping list, and communication. The accounting software keeps track of accounts such as credit cards, loans, checking and savings. It has a real time clock and calendar to measure the passage of time and records financial transaction logs in parallel with banks and other financial organizations. The data is secure in the PAL 10 by means of a secure card reader and biometrics. The PAL 10 is also capable of interacting with a user through voice recognition and fingerprint identification to provide a strong level of security (not shown).

The PAL 10 is designed to facilitate procurement planning. This planning will most likely take place as the purchaser or customer uses the PAL 10 to create lists of items to procure. For example, a merchant grocer distributes a flyer to each household in a district. To create a list the purchaser (customer) first scans in the merchant's specific optical code, which contains information pertinent to the merchant, including but not limited to sale terms and conditions. For each product listed, a printed barcode or similar code is produced that can be scanned into the PAL 10. To add a specific product to the list, the purchaser scans the product specific optical code. The code contains a product description, unit and price. The printed media advertisement will have a master barcode or similar control code identifying the merchant, date and sale terms. The purchaser scans in the master control code for each item to be procured. Items can be added or removed using the keypad functions. In addition, items can be added from memory based upon previous purchases as well as on-line from the merchant's web site. If the purchaser is Internet enabled, an RF device (not shown) attached to the personal computer will activate the RF link via the optical scan assembly 46, acting as an Internet port, and enable up loads and down loads to the PAL 10. The merchant will receive advance information on product selections. If the purchaser is not Internet enabled or chooses not to use the Internet, then the merchant receives this information on customer ingress into the merchant store.

Figure 2:
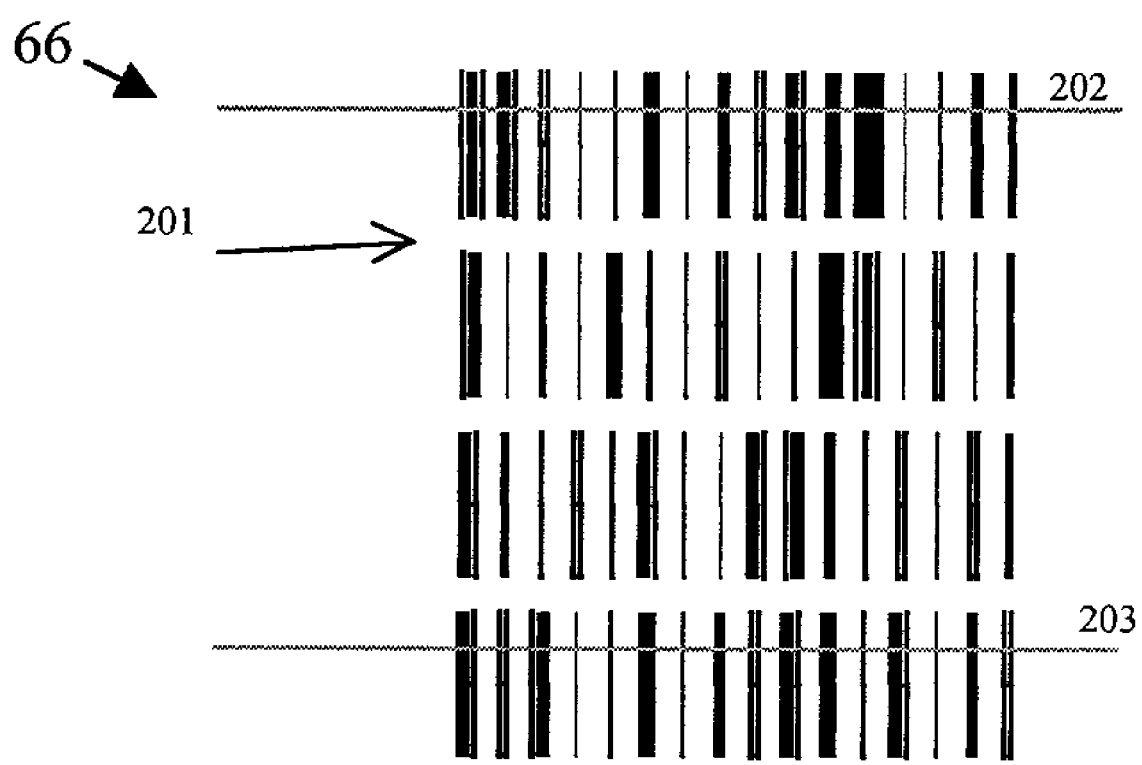
FIG. 2 is a pictorial representation of an example of a high-density barcode of this invention.

By scanning a high-density barcode 60, as shown in FIG. 2, the PAL 10 provides a screen of information relevant to the product scanned, in particular, similar data as received from a web site. The PAL 10 has executable software to create a browser frame where a high-density barcode 60 is scanned that contains programming and information about the product, and sales terms and conditions. The high-density barcode 60 makes use of printed media codes to extract information and present it to a user on the screen of the PAL 10. The high-density barcode 60 also extracts rules concerning the terms of the advertisement and presents the rules to the purchaser and alters the behavior of the PAL 10 while in a merchant's facility. The display information is encoded in the media in two parts. One part is the visual formatting instructions to the PAL 10 and the other is the information to be presented.

Printed media pattern codes such as barcodes can be one or more dimensional ink on paper print patterns that can be decoded by an optical scan assembly 46 into a number. There are many types of scan codes in existence. For example the Data Matrix code is a bi-dimensional code that can represent a maximum of 2000 ASCII characters. Another such code, PDF417, is another bi-dimensional code. In this code each line is composed of a variable number of columns that encode data. This code is bracketed by a Start character and Stop character. The main characteristics are a minimum and maximum number of columns and rows. Another code is Code 11. It is named for the fact it contains 11 possible code patterns. Still another is Code 39, an alphanumeric bar code that can encode decimal numbers, the upper case alphabet, and some extra symbols. There are many existing codes that could be used with the present invention. However, codes printed on low quality paper would not be able to support the dense ink patterns that many of these codes require.

As shown in FIG. 2, a high-density barcode 60 increases the amount of data that can be transmitted using poor quality paper, as found in a newspaper. The high-density barcode is a sequence of horizontal barcodes stacked into an arrangement that can be scanned in by a simple vertical sweeping motion of the hand. The scan will require limited uniform vertical motion, well within the capability of the wrist, elbow and shoulder. High-speed electronic processing is used to average out motion errors.

Figure 3:
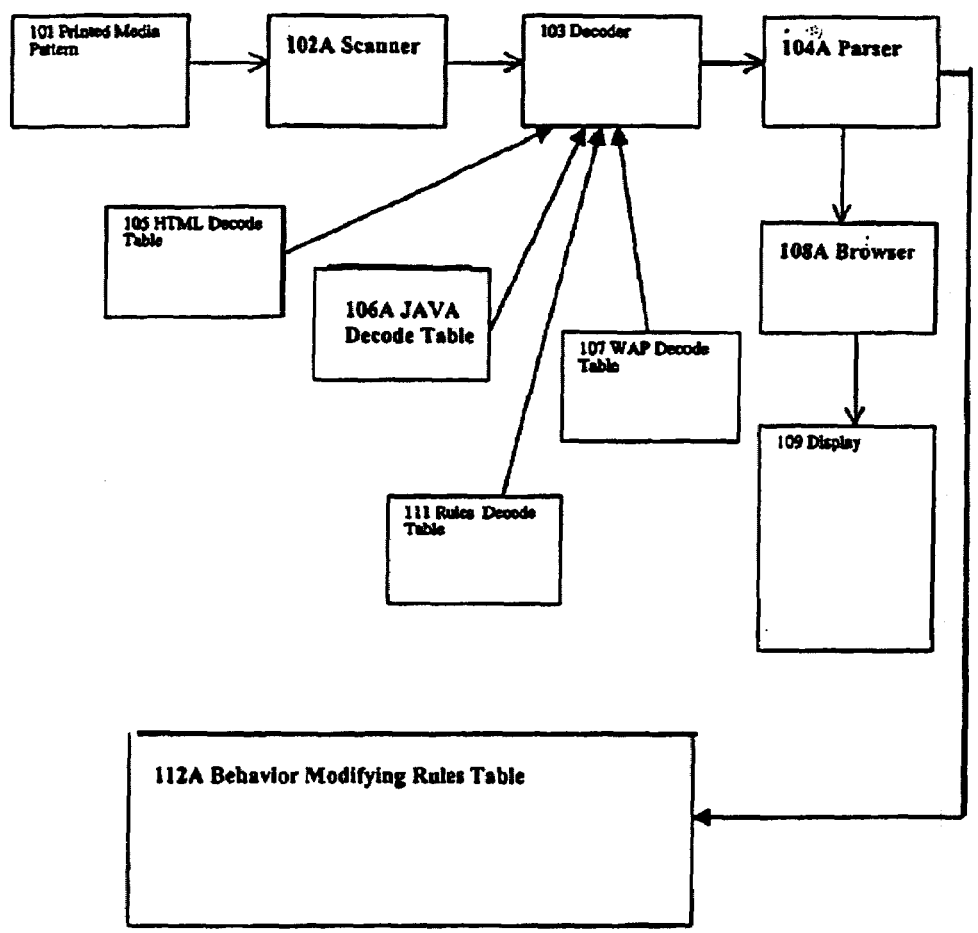
FIG. 3 is a block diagram of the printed media decode process of this invention.

An encode process, as shown in FIG. 3, shows how a vertical barcode or similar code can encode a WEB page display and/or behavior modifying rules. The encode process uses codes and checksums for data reliability. Returning to FIG. 2, the user will point a laser scan line 66 generated by the optical scan assembly 46 at the top barcode 202 and drag the laser scan line 66 to the bottom barcode 203. When successful the purchasing aid logistic appliance 10 will beep one short high-pitched note. If not successful the purchasing aid logistic appliance 10 will beep one long low sounding beep. Checksums in the code will indicate a successful scan. Also, other types of signals representative of information can also e printed by the PAL 10.

Returning to FIG. 3, the high-density barcode 60, which is designed to encode information required by the PAL 10 is scanned by a scanner 102A, designed to extract the amount of information required to represent a WEB page. A decoder 103 decodes the scan using rules concerning how numbers are coded to represent information. These rules are coded into tables represented by numerals 105, 106A, 107 and 111. These tables interact with the decoder 103 to provide parsing information to a parser 104A. The parser 104A creates the software that will build the display. The parser 104A can also identify rules and construct a Behavior Modifying Rules Table. The rules decode table 111 is a table that governs the rules of communications and commerce by the PAL 10. Specifically, the rules decode table 111 includes information specific to a unique merchant. When the PAL 10 is presented to the unique merchant, the rules decode table 111 will identify the merchant and terms and conditions of a sale. Information in the PAL 10 about other merchants will not be shared. The browser receives HTML or similar software from the parser 104A and creates a display 109.

The vertical barcode format, for example, does not contain a specific language, for example, Java or HTLM. Rather the vertical barcode will represent a sequence of numerical codes. Then from that, each suitable language will have a table from which a list of codes will generate a finite number of web page variations. The high-density barcode 60 identifies the table and represents codes indexed specifically for each language. The high-density barcode 60 uses the parser 104A to construct the frame software needed by a display browser 108A. This is a multi step process designed to make, for example, the vertical barcode format or a similar code independent of any browser language.

The high-density barcode 60 can represent an imbedded browser frame. There are many types of scan codes in existence. They vary by the size and type of code represented by the light and dark patterns of ink and paper. In the present art, a spot laser beam is swept into a line pattern by a reflecting device oscillating at a known rate. The optical receive path can be the exact same path. The laser spot may look continuous but is, in fact switched on and off at high speed to conserve power and for other reasons. The optical receive is gated to the rate the laser is turned on and off. The resulting optical detection pattern is processed to average and smoothes out any noise spikes. There will be several samples for each light and dark return. The dark returns will vary by the width of the ink line. A time base is established by the preamble to the barcode helping to determine the frequency of the phase lock loop for the remainder of the barcode. This process is similar to a modem training sequence.

Returning to FIG. 2, the layout of the high-density barcode 60 is shown in a vertical code format. The purpose of the vertical code format is to demonstrate how to build a barcode that contains sufficient information to build a WEB page or rules table. As more data is required, more codes are stacked until the practicable limit is reached. A first code line 202 shows where the first scan is started from and a last code line 203 shows the point to where the scan is dragged. The first code line 201 shows a timing space between stacked codes for the purpose of resetting the scan to pull in the next level. This is only an example to show how bandwidth dense codes could be built on poor quality paper.

Figure 4:
FIG. 4 is a tabular representation of the HTML decode table illustrated in FIG. 3.
Figure 6:
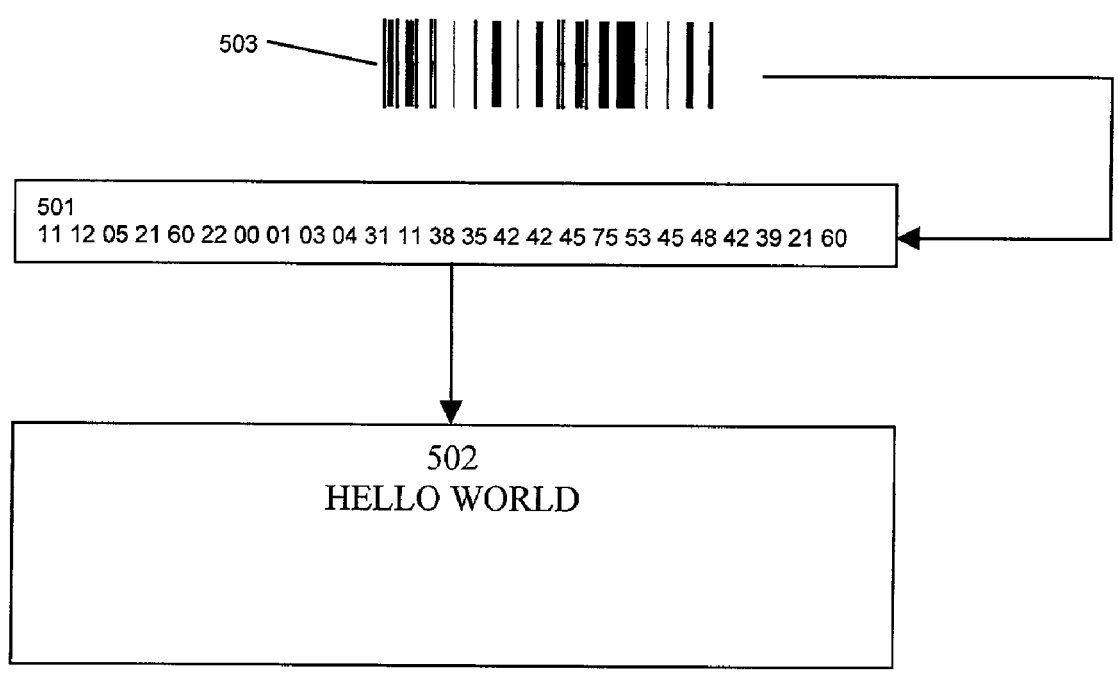
FIG. 6 is a schematic representation of the results of the barcode decoding process in accordance with the present invention.

FIG. 4 is a partial example of how to build a HTML decode table 105 of numerical codes indexed to coding statements. Some coding statements will require additional fields to fully populate the statement. The purpose of HTML decode table 105 is to reduce the need for information bandwidth by using numerical codes to represent entire statements. Thus by calling out codes and populating them with field data a full statement can be built conserving barcode bandwidth. FIG. 6 illustrates a minimum number of statements in the HTML decode table 105 to build a web page displaying, for example, "HELLO WORLD."

The parser 103, shown in FIG. 3, can build a fully functional HTML program by placing numerical codes 401, for example, in a sequence creating a coding pattern table as illustrated in FIG. 5.

The high-density barcode 60 or any similar print code contains a numerical table index code with data. The codes are cross-referenced to tables 105, 106A, 107, 111, as shown in FIG. 3. The index points to a software instruction contained in the HTML decode table 105, which contains a series of code values 401, as illustrated in FIG. 5. These values contain significance to the parser 104A. The HTML decode table 105 instructs the parse 104A how to interpret the value. For example, code 11 indicates the start of table data. The next value is one of eight possibilities corresponding to tables 105, 106A, 107, 111.

FIG. 6 is an example of the parsing process where the barcode 503 represents the numerical sequence 501. Embedded in numerical sequence 501 is code 11 12 05 which tells the parser 104A to select the HTML decode table 105 to interpret the remainder of the data and there are 5 code statements. Code 60 is a fictitious checksum value shown for example only. It will repeat at the barcode end. Code 22 indicates the start of table indices. Code 00 is the first entry in the HTML decode table 105. This first entry has no required fields. Index 04 is the first code statement to require a field. Code 31 tells the parser 104A the next value is the number of characters in the first field. If there were a second field, code 31 would appear again after the $11^{th}$ character code with a numerical representing the size of the next field. This process would continue until all fields were fully presented. Continuing with the example, 11 characters follow. They are coded in the range 31–56 which tells the parser how they to be interpreted as text characters. Finally code 21 appears again followed by 60. If the parser were able to calculate the same checksum a short high pitch beep would indicate a successful scan and the resultant 502 would be put up on the display. Numerical codes are used to represent coding statements from any descriptive language that can build a display by way of browser instructions. The vertical barcode format does not require a specific language for example WAP, JAVA or HTML. Rather the frame software will be built from numeric codes. For example the HTML statement: <p><table bgcolor="#000000" border=0 cellpadding=5 cellspacing=1 wIDth=468> could be designated by the numeric code 43. The high-density barcode 60 is based on the premise that a web page can be constructed from a closed list of software statements. By way of the present example, ninety-nine statements could be developed and referenced by a two digit decimal code. By way of example, any practical number could be used for example 199. Data fields follow other codes as shown in FIG. 3. The parser 104A can build the code statement and populate it with field data extracted from the printed code. At the conclusion of this process HTML or similar software is generated for a browser to generate a frame display.

By way of example, the vertical barcode format can contain information about a merchant and sale terms and conditions. This information is displayed and may be entered into the rules table 112A.

Figure 7:
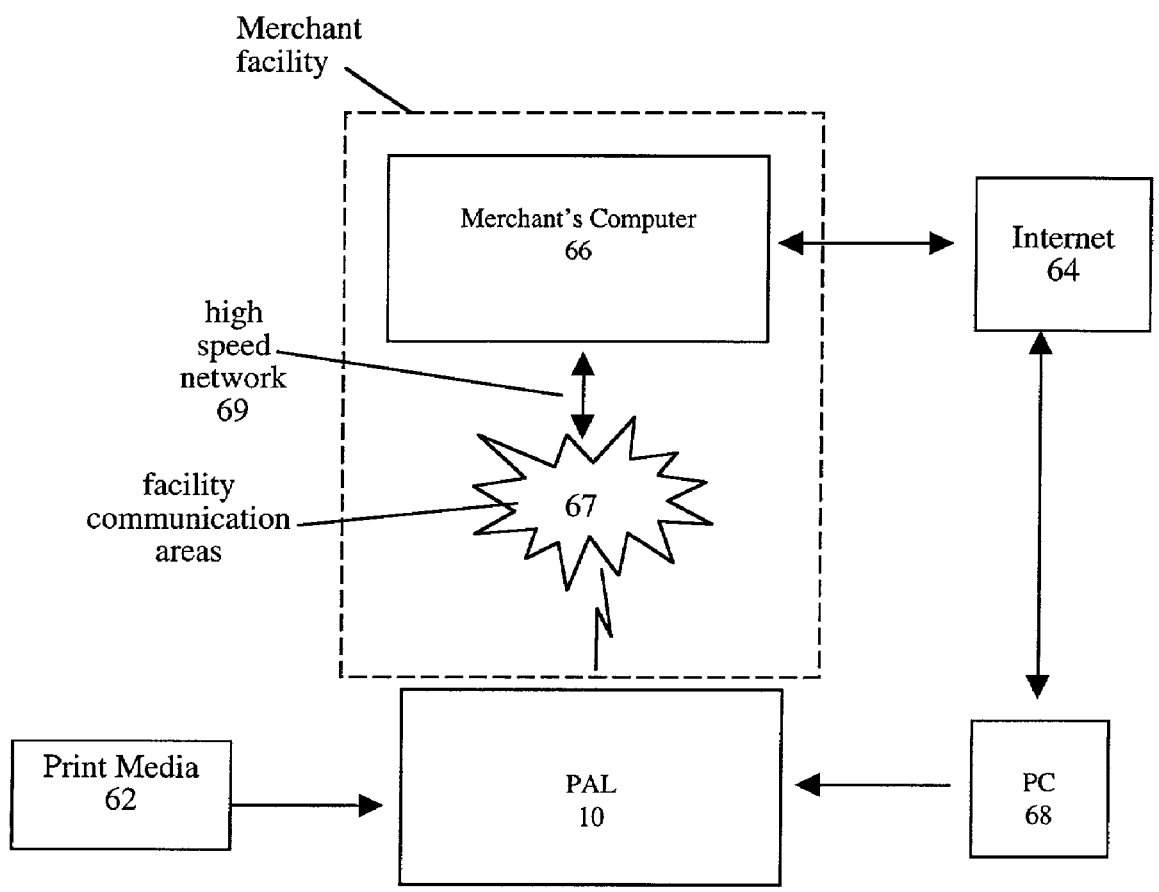
FIG. 7 is a flow chart of the information exchange links of the present invention illustrated in FIG. 1.

As shown in FIG. 7, the PAL 10 interfaces with print media 62, the Internet 64, and merchant's computer 66. Product data is downloaded to the PAL 10, where the purchaser makes decisions and creates merchant specific product lists prior to going to the store. In the planning stage of a purchase, for example, a purchaser may wish to know which products do not contain an ingredient. For example, the purchaser may require breads that do not contain sodium. The purchaser can access the merchant computer 66 through a personal computer 68 via the Internet 64, as illustrated in FIG. 7, and request a listing of products matching the request sorted by preferred merchants. The purchaser then will select a product for purchase and estimate a purchase date. The list for a merchant is managed by several factors including date when the date, for example, is a factor in terms and conditions. Price and availability may also, for example, manage individual items. Upon completion of the product list or shopping list, the PAL 10 can store the list until entry into the merchant facility or the PAL 10 can upload the list to the merchant's computer via an Internet portal for storage. The merchant may review the list and check inventory to assure the products are in stock.

The purchaser creates a list of items to procure and assigns a payment method to the list. The PAL 10 will manage the budget for the list and all lists. Since financial data is sensitive, the PAL 10 may utilize a security system in a layers concept to safeguard use. Layers represent various facets of the device from trusted monitor to smart cards to encrypted memory. Access to sensitive data begins with smart card technology and works through succeeding layers. The smart card technology would be employed for store critical secure data. The PAL 10 can read the magnetic stripe on credit or debit cards and down load this data into a secure memory where it can be retrieved and sent to the sales register at purchase time.

Figure 8:
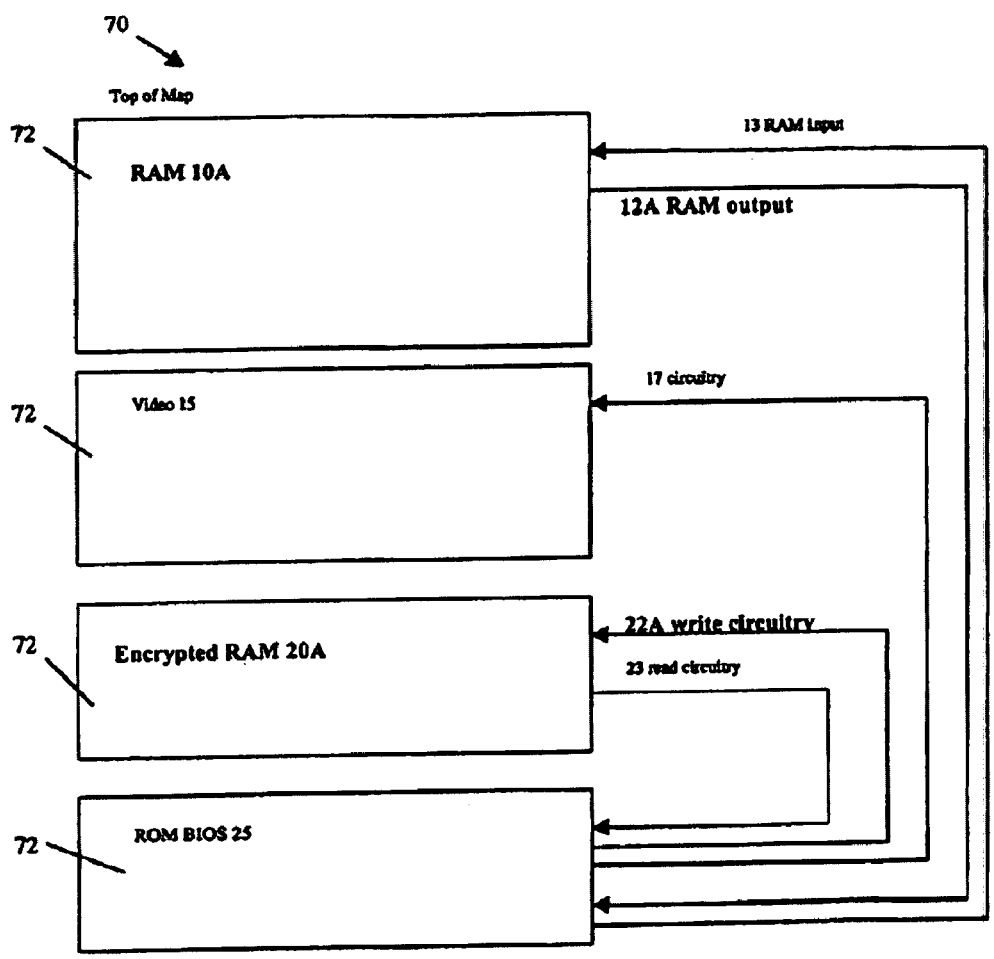
FIG. 8 is a flow chart of a memory map of the present invention.

The secure memory of the present invention, illustrated in FIG. 8, is included in a memory map 70, the most basic element of any computing device. The memory map 70 is organized into regions where specific tasks are performed. The regions are the physical address locations of a block of memory units 72. A memory unit 72 may be any number of bits but is usually a multiple of eight forming an eight-bit byte, sixteen-bit word, or thirty-two-bit double bit word. A single address location consists of several binary circuits, which must be decoded before the location can be opened for reading or writing. The central processor 11, illustrated in FIG. 1, sends out address signals on the address bus, which is processed by a memory address decoder. The decoder then selects which physical unit of memory is accessed. As shown in FIG. 8, an elementary memory map 70 in which the top of the map, RAM 10A, represents an area where a program and data are stored, with logical methods of data transfer to the RAM 10A, RAM input 13 and RAM output 12A. Programs stored on permanent storage devices are accessed by software in the read only memory basic input/output operating system and put into RAM 10A.

The specific memory used to hold the video image to be displayed is represented by video memory 15. The difference between RAM 10A and video memory 15 is the address range, which is coded a read only memory basic input/output operating system (ROM BIOS) 25. When a program executing in RAM 10A has data to write to the display, it calls the video out routine in ROM BIOS 25 and sends it data by way of the circuitry 17. This data is then displayed by the video generating circuitry connected to this memory (not shown), which is a well-understood process.

A similar method is used to set encrypted RAM 20. Encrypted RAM 20A has the same general properties of RAM 10A in that memory can be read from and written to. It has two modes of operation; the first is secure and second is disabled. By way of read circuitry 23 and write circuitry 22A encrypted RAM 20A functions as ordinary memory when set to secure mode. When encripted RAM 20A is set disabled the data retrieved by way of read circuitry 23 is not logical and therefore useless. Write circuitry 22A does not function in a logical manner when disabled. The order of data is sometimes referred to in the literature as big Endian or little Endian. This is a reference to which byte of a multi-byte retrieval contains the most significant bit and which contains the least significant bit. Without knowing which causes the data to be improperly interpreted.

Figure 9:
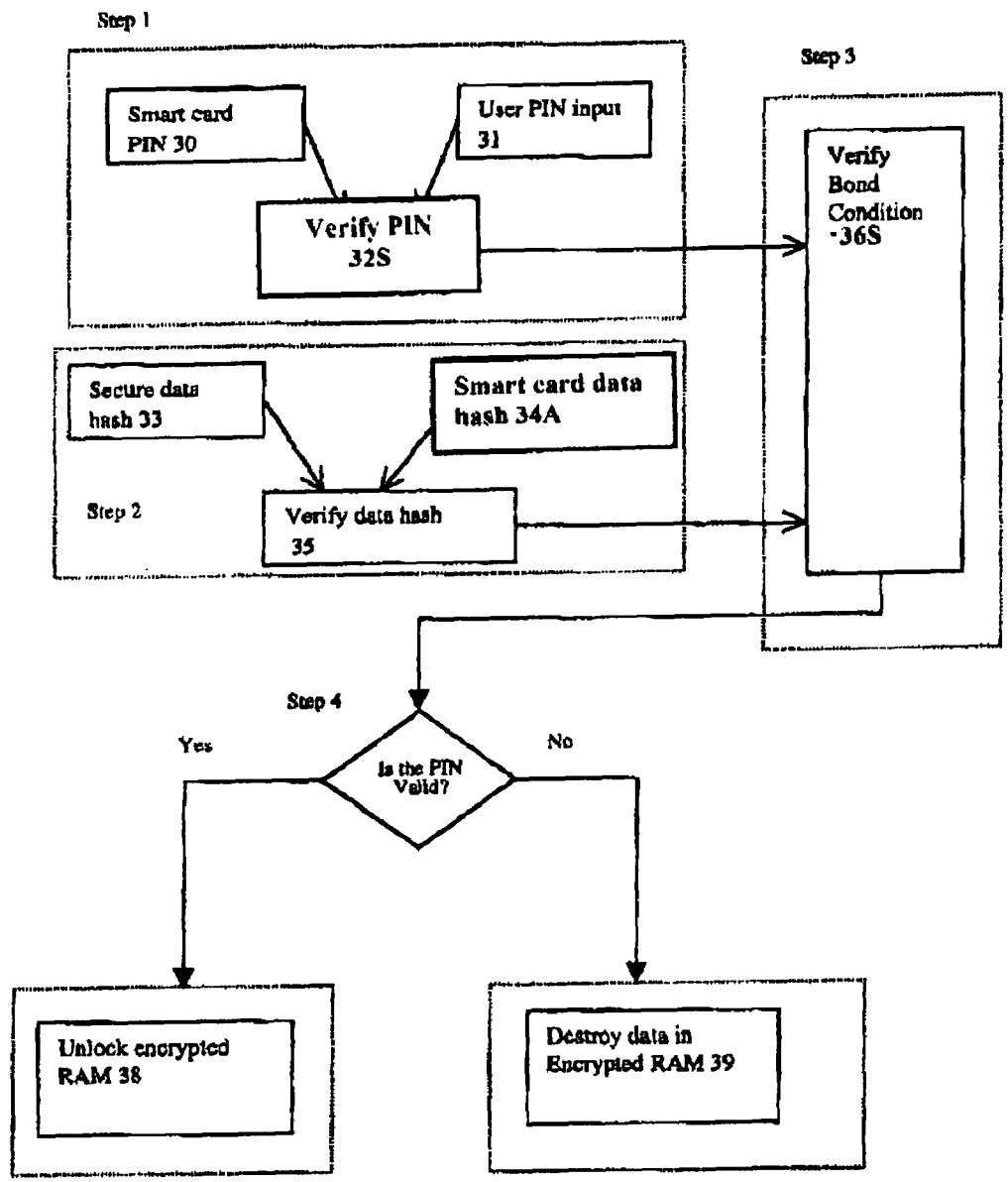
FIG. 9 is a flow chart of a three way verification process of the secure memory of the present invention.

FIG. 9 illustrates the use of encrypted RAM 20A in the present invention in a three way verification process. In step 1 a smart card is inserted into the PAL 10 and the pin 30 is accessed. The user is prompted to enter a personal identification number (PIN) 31. The user's PIN number 31 is verified 32S with the PIN 30 stored in the smart card. In step 2 a secure data hash 33 is compared to a hash 34A stored in smart card or any convenient location. If the comparison 35 is valid both then the process continues to step 3, a verification 36S of a bond created in a previous session. From a previous session, a hash of the secure data in encrypted RAM was created and stored in two places. One place is the smart card and other is on the PAL 10. If both step 1 and step 2 are valid then the decision branch at step 4 is yes and encrypted RAM is unlocked 38S and made available. The user then performs one or more transactions, which may or may not change the data in encrypted RAM. Then a hash-creating algorithm located in ROM BIOS 25, see FIG. 8, runs and creates a new hash for the next session stored on the smart card data hash 34A and on the PAL 10 for the next session. If steps 1 & 2 are not validated, then the data in encrypted RAM is destroyed.

Figure 10:
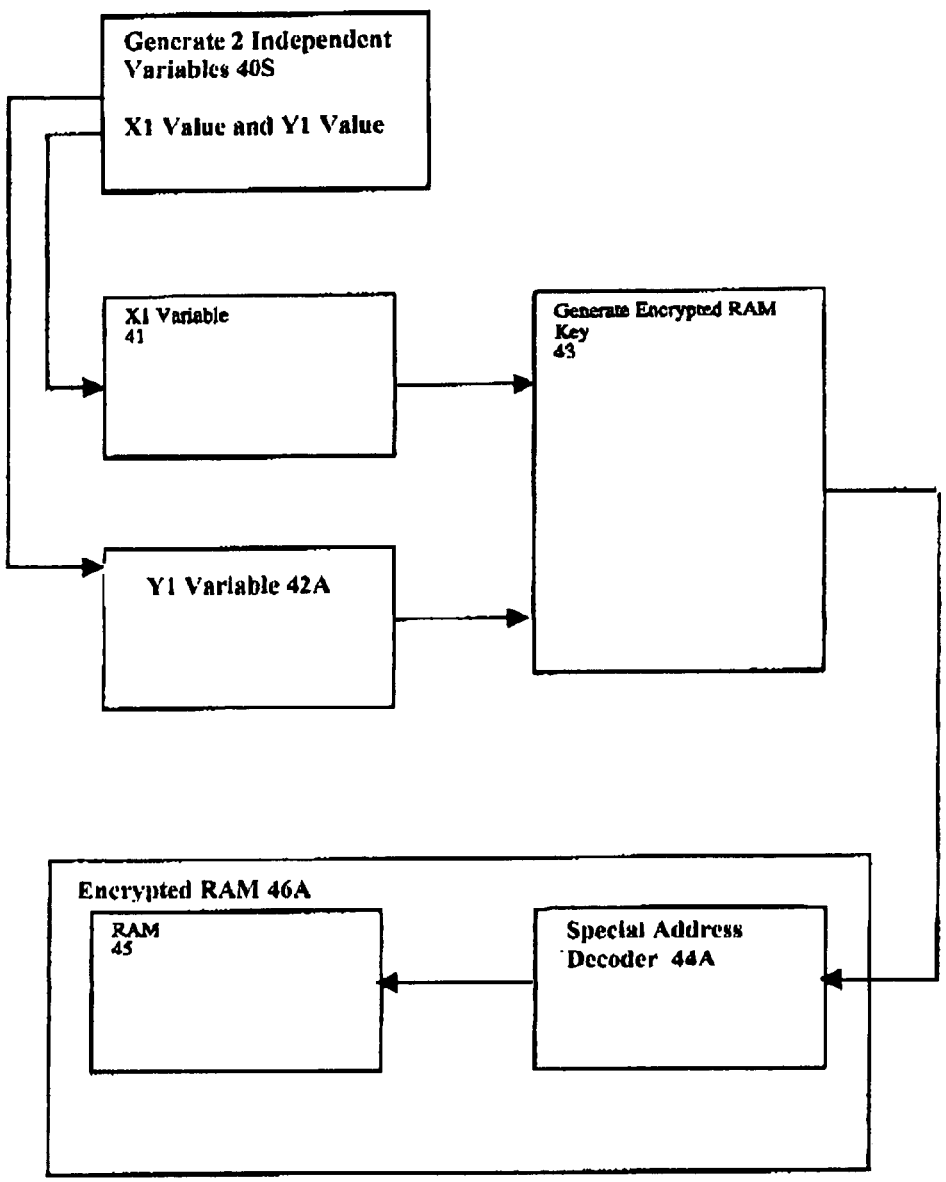
FIG. 10 is a flow chart of the key generation technique of the secure memory of the present invention.

FIG. 10 shows an alternative method of how encrypted RAM could be used in the PAL 10. First, two independent variables are generated 40S: the first variable 41 and the second variable 42A. The first variable 41 and second variable 42A combine in a process to generate a cipher key 43 that fits into a special address decoder 44A. Ordinary RAM is attached to the special address decoder 44A. Together, the special address decoder 44A and RAM 45 create encrypted RAM 46A.

Alternative applications of encrypted RAM could also have significance in non-mobile computers. For example a desktop computer can use encrypted RAM to securely store sensitive E-mail or other data. Many users leave the desktop computer on continuously. The common practice is to lock the keyboard and display with a password. If a thief can steal a password then entry could be made on a desktop. Encrypted RAM could then protect sensitive information. Now that several examples have shown how encrypted RAM could be used, following is a detailed explanation of how a special cipher locked address decoder could be made.

Figure 11:
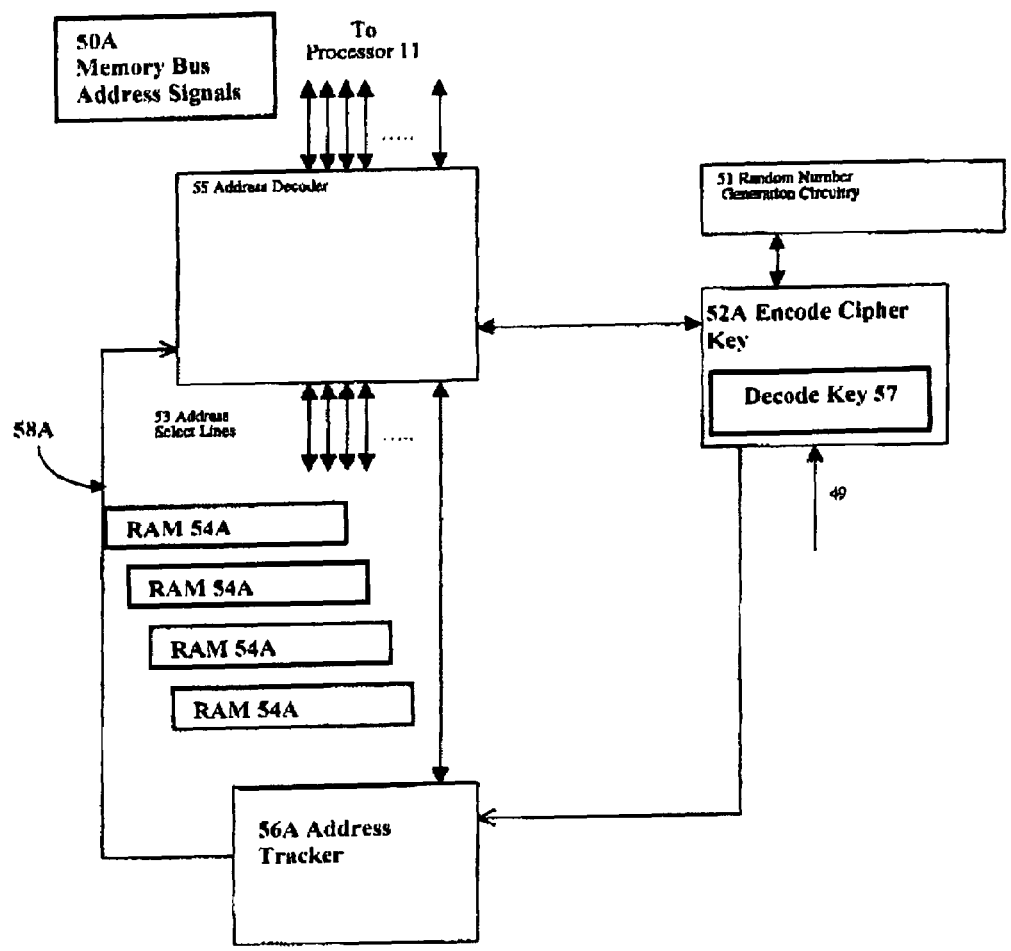
FIG. 11 is a flow chart of the address encrypted RAM of the secure memory of the present invention.

FIG. 11 is an alternative embodiment of encrypted RAM. A signal 49 starts and stops the encryption process. A portion of the RAM map 70, as shown in FIG. 8, is set aside for secure memory. A special address decoder 55 and an address tracked 56A generates the memory select lines using one of several possible mathematical formulae. This formula requires a random number be generated at the first time secure data is created then stored in address decoder 55. The random number encode or cipher key 52A is added to the address to create an offset address from the correct location. The contents of a memory location are not encrypted but its address is intentionally misaligned by a random number incorporated into the address decoder. This random number is used whenever this secure address range is accessed in secure mode. Note that this technique applies to static RAM, Dynamic Ram and Flash RAM where an address decoder is required to generate select lines. For the purpose of this example shown in FIG. 11, a RAM segment 54A is address encrypted. To keep the following example simple the memory RAM segment 54A will be limited to 1024 bytes (hex B000-B3FF) of memory but any size is possible and larger is better.

When the smart card is inserted into the PAL 10, the address decoder 55 reads and writes data in secure mode as normally directed by the central processor 11. In FIG. 11, a random number is generated by random number generation circuitry 51, hexadecimal F is used though any number is acceptable. The processor 11 now issues a write-to-memory command by calling for base address B000 50. The address decoder 55 receives B000 50 on the active address data bus from the central processor 11. The address decoder 55 also receives random number encode key hexadecimal F from the random number circuitry item 51. The address decoder 55 then computes memory select lines 53 as if the address were B00F. The central processor 11 writes a 4-byte variable so that 4 successive RAM 8 bit per byte locations are required. The next byte value from memory will be B001 bus address signals 50A but is instead computed as select lines for B010 (B001+F) by address decoder 55. The central processor 11 thinks it is writing B000 through B003 four successive locations for this one variable. The four bytes are now stored in B00F, B010, B0011, B0012. When the smart card is removed, the address decoder 55 now gets a signal not to use the random number encode key 52A generated by random number generation circuitry 51. Now the central processor 11 attempts to read what has been written and issues 4 read commands by memory bus address signals 50A beginning with location B000 through B003. The address decoder 55 functions normally but the data retrieved from these four locations B000–B003 is not coherent and therefore unintelligible. Next the smart card is again inserted using the previous example illustrated in FIG. 9 so that the address decoder 55 is now set to secure mode. The address decoder 55 now gets a signal to use the random number encode key. The four address locations B000–B003 are changed to B00F, B010, B0011, B0012 the exact same locations written to previously. The data is correctly retrieved. This example shows how data can be safely encrypted by intentionally misaligning the address. There is no record of the encode key stored in the RAM 10A as shown in FIG. 9, the RAM 10A where program and data are kept. Therefore the key cannot be retrieved by any method. Alternative embodiments include using –F instead of F as the encryption key, and binary compliment arithmetic could be used in place of simple addition. There are several valid methods other than strict interpretation of the above example capable of achieving the same purpose.

Returning to FIG. 11, the central processor 11 keeps track of where data is stored using well-understood programming techniques. Using encrypted RAM, the central processor 11 cannot accurately track where data is physically stored. It depends on the address decoder 55 to correctly interpret the hexadecimal address. When the central processor 11 selects an address close to the end of encrypted RAM boundary, the address decoder 55 may set select lines 53 to go past the last boundary address. In the previous example that address is B3FF. The address select lines 53 will trap any address computed to be past the boundary. In the previous example if the central processor 11 set the address lines to B3F1 and the address decoder 55 was set to secure mode then the address decoder 55 would set the select lines for an address of B400 (B3F1+F), where the upper boundary is B3FF. The address tracker 56 senses the condition and sends a signal 58A, ranging between 0 and E, generated by the address tracker 56A to the address decoder 55. This signal causes the address decoder 55 to reset the select lines 53 as if base address B000 were being decoded. The decode key 57 is generated by an encode cipher key 52A for use by the address tracker 56A. The decode key 57 is used to compute the value of the signal 58A. No address is used twice and no valid memory contents are overwritten and the central processor 11 cannot determine the equivalent address used.

The encode cipher key 52A can be changed from time to time to maintain an element of randomness. The random encode cipher key 52A may be generated once per active session. An active session is defined as a continuous RAM 54A power cycle. As long as the RAM 54A is active the encode cipher key 52 is not lost. If power to the RAM 54A is lost, then the encode cipher key 52A is likewise lost and data lost with it as well. There are other possibilities for setting rules regarding the generation of an encode cipher key 52A. For example a key 52A could be generated once per secure session and erased when the secure session is ended. In this case the data will be lost unless steps are taken to offload the encrypted RAM data to an alternate location. If the data were offloaded onto temporary storage then the encode key could be changed periodically and the secure data reloaded back to encrypted RAM. This would be better for security if the encode key were periodically changed. This technique makes it highly unlikely an external spoof can be used to strobe and read out secure memory.

Once the data is input into the PAL 10, the PAL 10 acts as a decision aid for purchasers by providing a variety of functions. These functions include, but not limited to, such factors as price, product location, shopping list, and stock status. It also acts as a purchase facilitator, capturing product data as the purchaser shops in the store. Furthermore, PAL 10 stores all purchase information including product data and purchase history. This PAL 10 can manage money from the purchase planning stage to the product selection stage to the checkout counter. Afterwards it can provide historical data for record keeping and historical analysis.

Figure 11A:
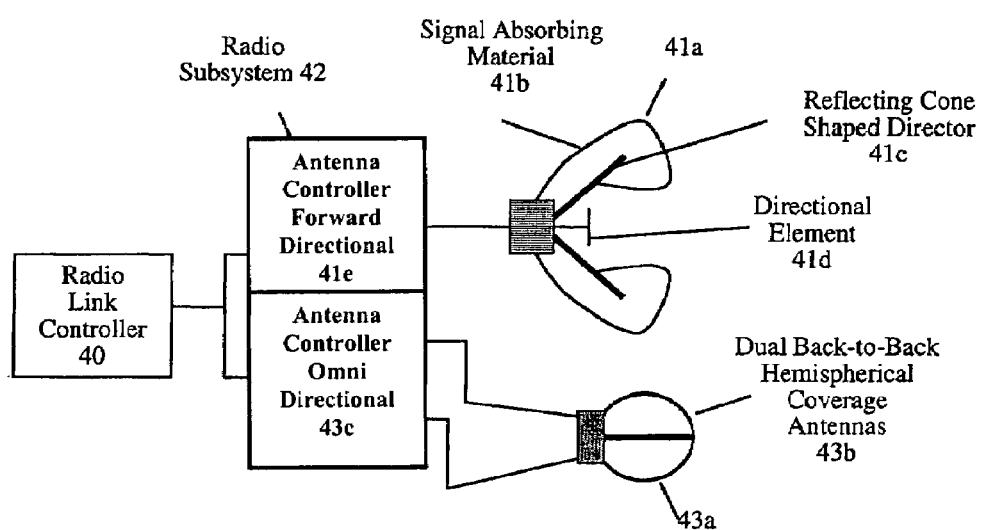
FIG. 11A is a pictorial representation of the antenna system of the present invention.

A radio subsystem 42 (FIG. 1) utilizes two conventional types of antennae, as illustrated in FIG. 11a, simultaneously. These two antennas, one a forward directional antenna 41a and the other an omni directional antenna 43a are used by the protocol to affect the RF link. The forward directional antenna 41a includes conventional components, such as, a signal absorbing material 41b, reflecting cone shaped director 41c, and a directional element 41d. The omni directional antenna 43a includes conventional dual back-to-back hemispherical coverage antennas 43b. By managing the power, a link can be created within the confines of an aisle shelf area (to be discussed below). The omni directional antenna is used to communicate with the PAL 10 when it is not within the confines of the aisle shelf area. Both antennas are operated from their respective antenna controllers 41e, 43c, and connected to the processor 11 through the radio link controller 40. The advantages of two antennas are diversity and multi channel link control giving the merchant computer the ability to manage large numbers of simultaneous users.

Figure 12:
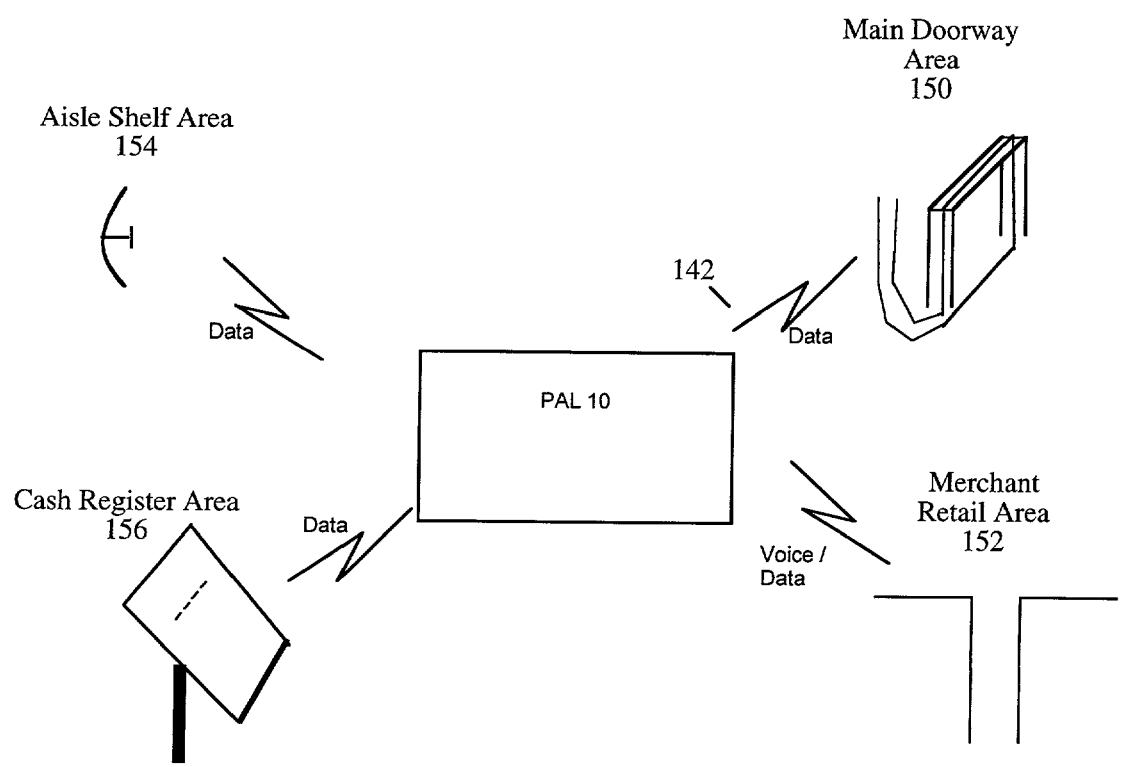
FIG. 12 is a schematic representation of the PAL communication links with the merchant computer within four (4) areas of the merchant facility.

As illustrated in FIG. 7, the facility communication areas 67 effectuate communication between the merchant computer and the PAL 10 in the merchant facility. The merchant facility is equipped with one or more facility communication areas 67. The preferred embodiment communicates four (4) ways in the merchant's facility as illustrated in FIG. 12. Communication limitations are a function of facility planning, not capability of the PAL 10. The first method incorporates quickly uploading and downloading data while traversing a main doorway area 150. The second method involves an omni directional general-purpose system for infrequent digital voice and short data bursts for use anywhere within the merchant facility area 152. The third method provides a short-range highly directional link to the aisle shelf area 154 for product data and location. The fourth method is used for securing an ultra short-range link to a smart cash register area 156. The PAL 10 communicates in the merchant's facility using radio frequency and or infrared signals. As illustrated in FIG. 7, 7he merchant computer 66 is linked to each of the four (4) areas 67 by a high-speed network 69.

MODE OF OPERATION

Figure 13A:
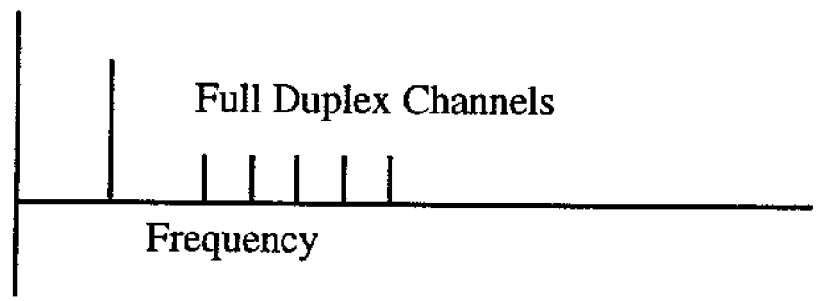
FIGS. 13A and 13B are plots of the ingress and egress barker beacon full duplex channels transmitted by the Main Doorway Area of the merchant computer illustrated in FIG. 12.
Figure 13B:
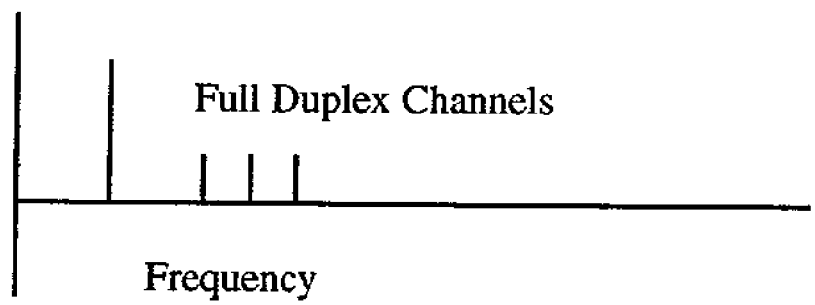

Referring to FIG. 12 of the drawings, when a purchaser (customer) first approaches the merchant's facility at the main doorway area 150, the PAL 10 encounters one of several RF barker beacons 142, which extend past the main doorway area 150 on either side. The barker beacon 142 advertises its presence by transmitting the next available full duplex RF channel, as illustrated in FIGS. 13A and 13B. An ingress barker channel 210A, illustrated in FIG. 13A, is used to greet the PAL 10 when it enters the facility, and an egress barker channel 210B, illustrated in FIG. 13B, is used to clear the PAL 10 from the facility. Each beacon 142 can manage a list of channels, 210A. Larger busy doorways will have more barker beacons 142 than smaller less busy doorways. Each PAL 10 will constantly monitor the beacon channels. Each PAL 10 coming into the facility will enter with a variable logic condition "OUT_RETAIL_SPACE" set to true in order to effect which beacon 142 PAL 10 listens for. When the PAL 10 has successfully entered the main doorway area 150, the logic condition "IN_RETAIL_SPACE" will be set to true. Only one of the conditions may be true at a time. On coming in the main doorway area 150, PAL 10 monitors each ingress barker channel 210A for the next available channel. When an ingress barker channel is read, the PAL 10 will monitor the energy. If no energy is present it will begin actuation of a short-term time random counter from 0 to 10 milliseconds. If the counter timer expires and there is still no energy present in the channel then PAL 10 begins to transmit its shopping list with other pertinent data to the merchants-in-store computer system 66, see FIG. 7. If during the short-term counter period the PAL 10 detects the presence of energy then it switches to the next highest free channel or moves onto the next barker beacon 142. The bandwidth associated with the barker beacons is separated into a band for customers coming in and a smaller separate band for the customers leaving. There is sufficient frequency diversity so those entering will not interfere with those leaving. Likewise the full duplex channels, 210A, 210B are sufficiently separated so each PAL 10 entering the facility is afforded a high speed channel fast enough to upload a shopping list file in the time it takes to traverse the main doorway area 150.

Alternatively, upon completion of the product list or shopping list, the PAL 10 can upload the list to the merchant's computer via an Internet portal for storage. The merchant may review the list and check inventory to assure the products are in stock.

After the shopping list file has been uploaded, the merchant computer 66, see FIG. 7, returns pertinent data back to the PAL 10 while the PAL 10 is still traversing the doorway area 150, see FIG. 12. A numerical ID value is assigned to each PAL 10 while it is in the facility. If desired, a customer may set the PAL 10 to provide customer identification through the use of a trusted surrogate ID that only has meaning to the merchant. If this information were to be intercepted it would have no value without the merchant computer's database. Likewise a customer may set the PAL 10 to deny customer private identification. On the other hand, the customer may set PAL 10 to accept a merchant's database pointer value, which becomes the customer's In-Store ID and returns this pointer value when communicating with any of the link methods. The barker beacon 142 will identify the merchant, address date and time and next channel assignment. These values will be sufficient for the PAL 10 to retrieve the merchant's database pointer set from a previous time and uplink it along with the item list. Likewise the customer may choose not to send the database pointer but instead use a unique generic ID in place of the specific ID. Up linking the database pointer differentiates a patron user from a public user. The merchant will set customer treatment rules accordingly so that the merchant computer 66 sends the correct information to each user. For example the merchant may wish to exchange a personalized greeting for each patron and a general greeting for a public customer.

In the preferred embodiment, each barker beacon 142 will manage a list of 4 full duplex channels, for example, of 750 KHz bandwidth centered at 1 MHz intervals beginning at 381 MHz ending at 384 MHz. A UHF (ultra high frequency) is used in the main doorway area 150 such that the barker beacons 142 is transmitted at, for example, a 5 MHz spacing beginning from a fixed point, however, any frequency band that meets the needs is acceptable. The barker beacon 142 advertises channel 1 is free. The incoming PAL 10 tunes to 381 MHz and senses energy levels. If no energy is present then the PAL 10 commences a random timer from 0 to 10 milliseconds. At the end of the timer if no energy is present then it transmits data to the merchant computer 66, see FIG. 7, at a middle power setting. The merchant computer 66 will send data to the PAL 10 to adjust the transmit level up or down from the midlevel setting so the total RF energy in the main doorway area 150 is managed so all users can communicate without interference. Then the next barker beacon 142 is set at 385 MHz and likewise has 4 channels to manage. If the 380 MHz list is full then the beacon advertises the next beacon as the next channel so, in effect, it manages a list of five numbers, four of which are active and one of which is used to inform the PAL 10 to seek out the next beacon.

The merchant computer 66, see FIG. 7, continually monitors the received data for errors. If a Bit Error Rate (BER) exceeds an arbitrary threshold value, it will issue a command to the PAL 10 to increase transmit power. The PAL 10 and the merchant computer 66 continuously exchange RF performance and BER information interspersed with data.

Therefore, when the customer visits a merchant, a radio frequency RF link is created on entering the main doorway area 150 with only merchant specific data is uploaded from the PAL 10 to the merchant computer 66, where the store inventory is stored. All other data remains secure and protected. A majority of the time the purchaser (customer) will have selected items from a general list prior to entering the facility in the purchase-planning mode. At other times the customer has only listed a category (categories) of products rather than a specific product. Those items, which fit the category or categories along with any product promotion in the category, will be uploaded upon entering the facility. Specific information provides the purchaser with product, price and aisle location that helps in quickly locating the correct product. This data may be downloaded to the PAL 10 as the purchaser enters the main doorway area 150. Products can then be organized by aisle location to maximize selling opportunity and customer convenience.

Also, by the act of entering or ingress, the PAL 10 can also request to download data pertinent to personal preferences. This data is not related to any advertising the merchant wishes to send. Also, the purchaser will be able to obtain merchant's advertisement data downloaded from the ingress short-range RF link or select to ignore any such advertisements.

Still referring to FIG. 12, as the PAL 10 leaves the doorway area 150, out of range of the barker beacon 142, and enters the facility, the channel 210A is freed up and returns back to the available state. The PAL 10 is assigned a full duplex VHF channel for omni directional general communication in the merchant facility (retail) area 152. The VHF band is chosen in this example for its ability to work with an indirect line of sight. Other PALs 10 may share the channels. This link is designed for short data burst traffic and infrequent digital voice traffic. The main characteristic of this link is the need for indirect line of sight communications when the PAL 10 is not in contact with the aisle shelf area 154. Location data, "retail" space map segments and infrequent voice paging are carried on this link. Antennas (not shown) in the merchant facility area 152 are positioned strategically within a store. These antennas are designed to communicate in the full range of space with voice and pager communications. The merchant computer 66, see FIG. 7, will periodically "ping" each PAL 10 in its list of "IN_RE-TAIL_SPACE" set true to see if the PAL 10 is still within the facility. Each PAL 10 will respond with its temporary ID value. If no reply is received within a predetermined time out period, the PAL 10 is assumed to have left the space.

The merchant computer 66, see FIG. 7, can differentiate between voice data packets and general data packets. Voice packets are labeled and time stamped for priority processing. Voice compression and weighting reduce the need for bandwidth. Voice messages are not guaranteed real time processing. They are processed for guaranteed delivery and response with a paging system. If a customer or user were in the area of, for example, aisle ten and needs customer assistance then the customer would use the PAL 10 to summon assistance. The merchant's employees/sales associates may carry a network phone and paging device (not shown). The PAL 10 has voice input and output and therefore can call and talk with the sales associate on a paging device (not shown). Location data can appear on the paging display on the paging device while two-way voice communication is in progress.

One or more PALs 10 can be in two-way communication with antennas (not shown) in the aisle shelf area 154 to ascertain which shelf the customer is working with. The system will also know how long a customer dwells in front of a shelf and which aisles the customer uses. This data becomes the "breadcrumb trail" and can be overlaid on a map of the merchant's facility so the trail can be shown with actual denoted times.

Communications in the aisle shelf area 154 is asynchronous between the PAL 10 and the merchant computer 66. When a customer aims the PAL 10 away from an antenna in the aisle shelf area 154, the link continuity is broken and the merchant computer 66, see FIG. 7, will then terminate the link. When a PAL 10 enters the field of the antenna, a link is established with data being exchanged on a transaction-by-transaction basis. For example, scanning a barcode will trigger a transmission; requesting a map to the next product in the list will trigger a transmission and reception; requesting product information, a voice pager link or similar activity will trigger a transmission and cause the PAL 10 to wait for a reception.

When the purchaser (customer) selects a product from the shelf, and scans the product barcode or unique identification symbol before placing it into the cart, each price unit quantity is scanned in. The price for that product was downloaded when the PAL 10 is in the main doorway area 150 or the aisle shelf area 154. If the purchaser sets a budget maximum then, the PAL 10 will signal the purchaser when the limit is reached. If the price was not available or is incorrect, the purchaser can enter the price through a touch screen. Differences are reconciled at checkout. Prices are totaled as items are added. Items can be added or removed from the list at any point prior to checkout. When the purchaser scans in each item to be purchased, the PAL 10 matches it against the shopping list. If an item is not scanned in, the PAL 10 will notify the purchaser of forgotten items. Items will not be forgotten until the purchaser discards the item prior to checkout. When a customer removes an item from the shelf and scans in the unique product ID that number is registered in the PAL 10. The PAL 10 will broadcast to the appropriate station the ID of the item selected.

The merchant computer 66, see FIG. 7, keeps track of the purchase list items as the purchaser removes them from the shelf. The PAL 10 will in turn receive current price data. If there is a discrepancy against a previous price value, the purchaser is notified and has the option of returning the item to the shelf. If the purchaser returns the item to the shelf, the purchaser removes the item from the procurement list on the PAL 10 display and the merchant computer 66 receives the updated information so the shelf item count is updated. This aspect of the present invention saves the merchant restocking labor.

Figure 14:
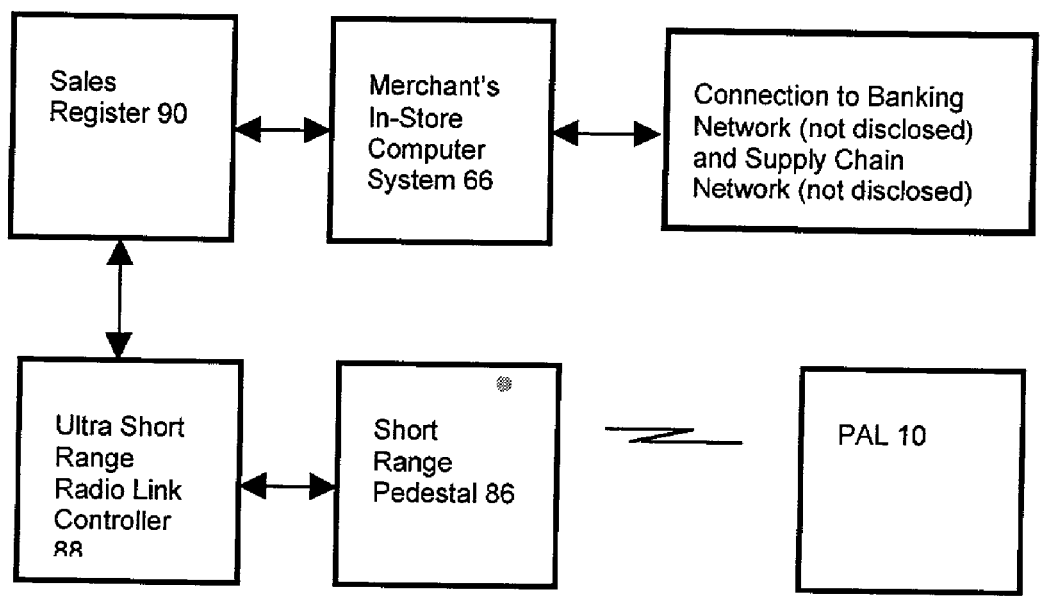
FIG. 14 is a process flow diagram of the PAL and checkout communication system of this invention.

The checkout process is illustrated in FIG. 14. Proceeding on to the checkout area the customer places the PAL 10 onto a conventional short-range pedestal 86. On the pedestal 86 the link is actively managed in fractions of an inch. The frequency band chosen for this link must be capable of meeting the demands of the link. This link functions like the aisle link except it is managed for link distances in fractions of an inch. Super high frequency microwave, infrared or optical are frequency bands that meet requirements. This type of link is designed for high security, however conventional encryption techniques may also be used. The link power budget is managed so no energy escapes the contiguous link volume subtended when the PAL 10 is resting on the pedestal 86. A conventional infrared or optical port (not shown) connected to the radio subsystem 42, see FIG. 1, can be fashioned so that it covers up the active area on the pedestal. A conventional link power management circuitry (not shown) keeps the power level very low so no detectable energy escapes the seams between the PAL 10 and the pedestal surface. Likewise, for example, a 100 GHz super high frequency microwave can be embedded in the pedestal 86 so fractional microwatt power level can be used.

The ultra short range radio link controller 88 is connected to a smart cash or sales register 90, which establishes two-way communications between the PAL 10, via the optical scan assembly 46, and smart cash or sales register 90. When a PAL 10 is first placed on pedestal 86, a signal from the pedestal 86 detects the presence of a PAL 10. Once the presence is detected, the ultra short range radio link controller 88 establishes communication by sending a control signal to the PAL 10 to enable control of the transmit power level from the PAL 10 back to the pedestal 86. Communications with the smart cash or sales register 90 follows normally. The PAL 10 can be removed from the pedestal 86 in the data exchange process. This action will momentarily interrupt the exchange process. The process will be automatically restored when the PAL 10 is returned to the pedestal 86. The pedestal 86 contains conventional electronics and antenna elements (not shown) needed to manage the micro RF link. The link exists only when the PAL 10 is on the pedestal 86. The RF field falls off to zero very rapidly away from the pedestal. This method limits what other PALs in close proximity or adjacent to the pedestal can sense. Others will not detect the presence of the micro RF field.

Once the PAL 10 forms a link with the smart cash or sales register 90, quantity and price can reconcile the purchase list. Discrepancies will be discovered and displayed immediately. When the purchaser is satisfied with the results, a confirmation is made to send a credit or debit card data (not shown) to the sales register 90 automatically. The cash register receipt is returned electronically. A history of purchases and payment methods is maintained. The purchaser can reconcile the data with financial statements. The data then can be discarded or downloaded to a personal computer for long-term retention. A running balance is maintained in all accounts. The purchaser can have funds added at scheduled intervals. The real time clock will monitor the financial calendar schedule and perform actions on schedule.

As mentioned above, the PAL 10 may prompt the purchaser for a payment means such as cash, credit or checking. The payment method could have been set prior to entry but this is not required. If the purchaser is paying by cash the PAL 10 subtracts the amount from the total (set by the purchaser or computed from previous transactions, or downloaded sales slip from the sales register) and shows the remainder. If the payment is by check then the check number, date and amount will be kept and down loaded to the purchaser's personal computer later. This data is not entered manually by the user but returned by the sales register for an automatic log. Other check data may be entered manually if so desired. If payment is by credit or debit card, a link is made to a banking network 92A, see FIG. 14.

Rebates offered by the merchant and manufacturers are automatically transacted by the system of this invention. The customer will see the rebate offer transmitted by the station RF link for a scanned product. At the sales register the customer information necessary for the rebate is up loaded to the sales register to supply chain network 92B, see FIG. 14. The customer will receive the rebate in due process and no further action is required. If the customer decides to return a product, the sales register attendant will scan in the unique product ID. The system will recognize the ID as having a rebate process pending and cancel the pending process. The merchant saves processing time and expense by such a procedure.

Upon completion of the sales transaction, the customer can store the PAL 10 on his/her person and leave the store with the shopping history stored in PAL 10 for future use.

Figure 15:
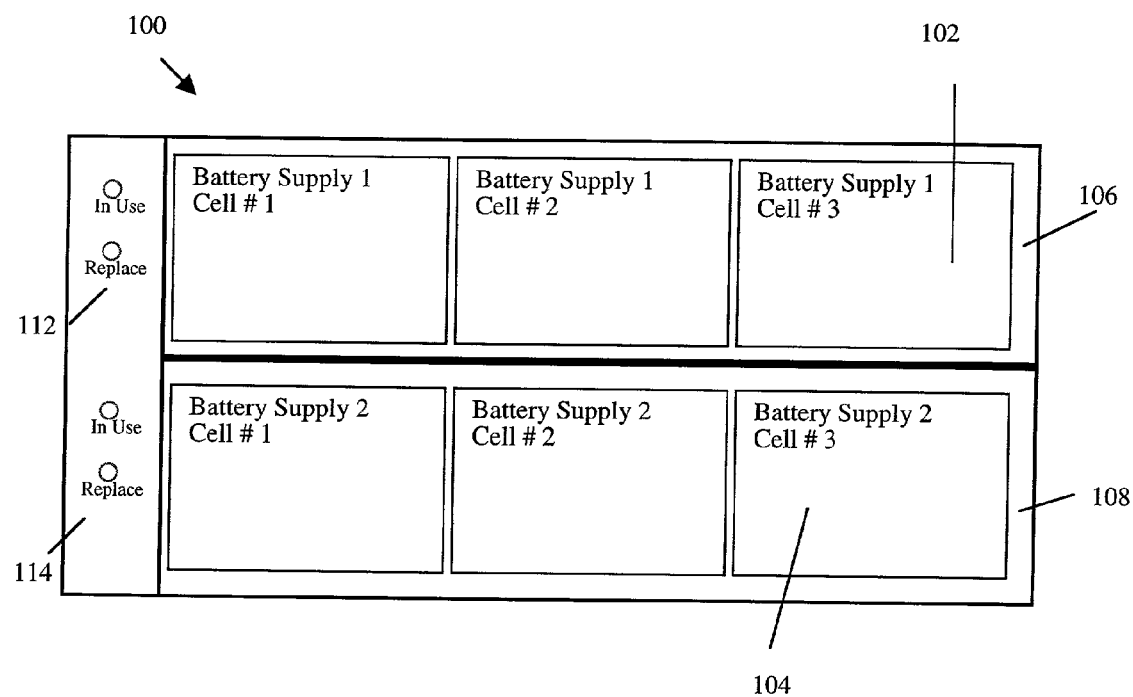
FIG. 15 is a pictorial schematic representation of the power supply of the present invention.

FIG. 15 shows the power supply 100 needed to operate the PAL 10. The power supply 100 uses two sets of batteries 102, 104 to provide power. Only one set is needed at one time. The processor 11, see FIG. 1, is in communication with both sets to sense a low condition on the active set and to manage power, for example, by automatically switching to the second set and/or notifying the customer to change the depleted set. Since the PAL 10 will be used for financial transaction processing, it will require a high degree of reliability. While the device may be designed with high reliability methods and components it will have a prominent risk of failure due to dependence on batteries. To mitigate this risk, special circuits are employed to manage two independent sets of batteries. The PAL 10 only runs from one set of batteries alternating between the two. As one set is run down, a power intelligence algorithm run by the processor 11, see FIG. 1, transfers to the second set. The user is prompted to change batteries of the first set. Each set of batteries has an indicator to mark the battery set for changing. Two adjacent compartments 106, 108 with a divider 110 separate the two-battery sets 102, 104 under the battery cover (not shown). An intermittent indicator 112, 114 of any color, though red is preferred, flashes to denote the tray compartment having run down batteries. The display 22, FIG. 1, contains graphics and instructions on how to change the batteries. The customer is not required to change batteries immediately, up to a few weeks, after the PAL 10 has shifted over to the second set. When the second set begins to run down, the frequency of reminders increases. At the sixty-percent remaining level, the PAL 10 will not perform any functions until the first set is replenished.

Figure 16:
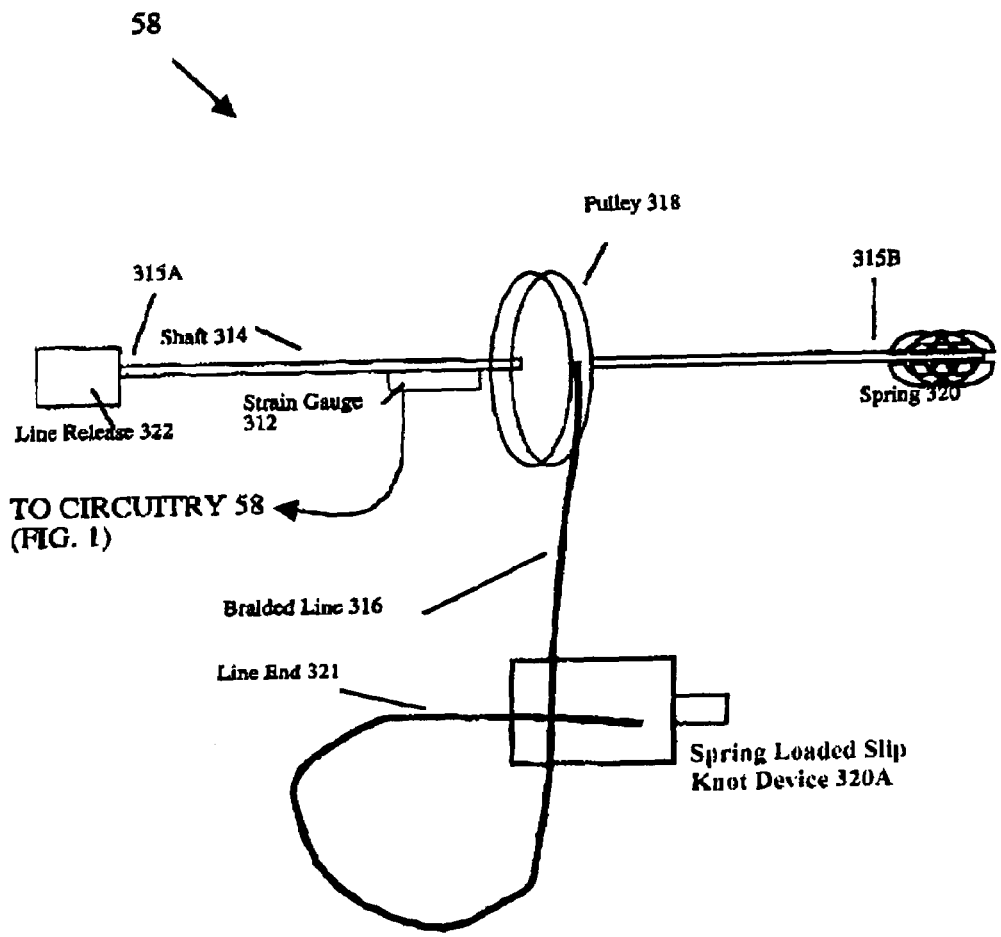
FIG. 16 is a pictorial schematic representation of the weight-measuring device of the present invention.

Finally, an additional feature of the PAL 10 of this invention, as illustrated in FIG. 16, shows how PAL 10 can measure weight. Weight is a key parameter for measuring out quantity to determine price. The weight measuring device 58 includes a strain gauge 312 mounted on a shaft 314. The shaft 314 has a fixed end 315A and a free end 315B. The fixed end 315A is fixedly attached to the PAL and the free end 315B is rotatably attached to the PAL 10. A spring 320 is fixedly attached to the PAL 10 and the shaft free end 315B. A line 316 is wound on a pulley 318 having a slip knot mechanism 320A on the free end 321 of the line 316. The slip knot mechanism 320A allows the line to form an adjustable loop. The loop can be cinched to hold material without bottom support while the PAL 10 computes the weight of an object purchased. The pulley 318 is fixedly attached to the shaft 314. The line 310 is cinched tight to hold the object. The PAL 10 then determines the weight based on the strain measured by the strain gage 312 as the shaft 316 torsional deflects under the load of the object. The user then can add price input to determine the total price. The PAL 10 is equipped with a method for accurately measuring the weight of a small amount of mass. A pulley, shaft and springs are used to make a self-retracting mechanism for storing a strong lightweight braided line. The line material is chosen so that it will not stretch over time or distort in any way when used within design limits. A line release mechanism 322 on the PAL 10 handle releases a lock (not shown) that allows the line 316 to be extended from the PAL 10. The strain gauge 312 is connected to the analog-to-digital converter 56, thereby linking the weight measuring device 58 to the processor 11, as illustrated in FIG. 1. The strain gauge deflections are transmitted to the central processor 11 for conversion into weight and calculating purchase price based on the cost per unit weight inputted by an input device, such as an optical scanner or keyboard.

Although the invention has been described with respect to various embodiments, it should be realized this invention is also capable of a wide variety of further and other embodiments within the spirit and scope of the appended claims.

What is claimed is:

1. A handheld portable 2-way secure purchasing aid logistics appliance (PAL), comprising:
    an optical reader subsystem and optical scan assembly configured to scan high density bar codes into said PAL as scanned information, said optical reader subsystem and optical scan assembly configured to extract from said scanned information numerical codes related to a web page representation and provide said scanned information as input data;

encrypted random access memory (RAM) configured to store said input data including encryption keys, financial data, and PAL owner name in said PAL, said encrypted RAM having secure and disabled modes;

voice analog circuitry having a speaker and a microphone, and configured to receive voice samples as said input data;

a central processor coupled to said optical reader subsystem and optical scan assembly, said encrypted RAM, and said voice analog circuitry;

a secure trusted monitor program executable by said central processor and configured to store said voice samples for biometric voice recognition;

a decoder executable by said central processor and configured to decode the numerical codes according to merchant-specific rules and provide the decoded numerical codes to a parser that creates web page software to build said web page representation;

a browser configured to receive said web page software and create a display from said web page software;

a magnetic stripe reader coupled to said central processor and configured to receive said financial data as said input data;

a smart card reader coupled to said central processor and configured to receive said encryption keys as said input data;

a remote ear piece coupled to said central processor and configured to provide output data;

a front panel including keys, switches and indicators coupled to said central processor and configured to provide 2-way communication and receive said input data;

a micro video display controller having a micro video display coupled to said central processor and configured to provide said 2-way communications and receive said input data;

a touch screen display having a touch screen interface controller coupled to said central processor and configured to receive said input data;

a weight-measuring device coupled to said central processor and configured to receive said input data;

a radio link controller and radio subsystem configured to provide secure communication coupled to said central processor and configured to provide 2-way communication and receive said input data; and a primary battery set and a backup battery set, said primary battery set supplying power to said PAL until said primary battery set is depleted, said PAL automatically switching to said backup battery set when said primary batter set is depleted;

wherein said central processor processes said input data, creates shopping lists from said numerical codes, and provides said shopping lists and said web page representation on said touch screen display for manipulation by the user through said front panel and said micro video display;

wherein said radio link controller and radio subsystem provide said shopping lists to a merchant computer.

2. The portable 2-way secure purchasing aid logistics appliance according to claim 1 further comprising:

a plurality of antennas configured to enable non-interfering and secure communications between the PAL and said merchant computer for a plurality of simultaneous signals, said merchant computer configured to enable each of said plurality of antennas independently based on the location of said PAL with respect to said plurality of antennas, wherein said radio link controller and radio subsystem are configured to receive signals based on the location of said radio link controller with respect to said plurality of antennas, from a radio transmitter coupled to said merchant computer through said plurality of antennas, wherein said merchant computer transmits product information in response to one of said plurality of signals by said PAL for said product information.

3. The portable 2-way secure purchasing aid logistics appliance according to claim 1 further comprising:

an internet port connectable to a personal computer linked to a merchant web site, said merchant web site downloads product information to said internet port in response to one of said plurality of signals by said personal computer for said product information.

4. The portable 2-way secure purchasing aid logistics appliance according to claim 1 wherein said optical reader subsystem and optical scan assembly scans print media bar codes having product information and generates bar code signals to said central processor for further processing.

5. The portable 2-way secure purchasing aid logistics appliance according to claim 4 wherein said central processor compares said shopping list to said bar code signals to determine whether product is a new product to add to said shopping list or an existing product, whereby said central processor tracks a total cost of said products scanned, the said products remaining to be scanned, and available funds remaining in a budget.

6. The portable 2-way secure purchasing aid logistics appliance according to claim 4 wherein said central processor includes executable software to convert said bar code signals into said web page representation to be displayed on said display.

7. The portable 2-way secure purchasing aid logistics appliance according to claim 6 wherein said decoder comprises at least one decode table, said decoder configured to interpret, according to said at least one decode table, said bar code in one of a plurality of computer languages.

8. The portable 2-way secure purchasing aid logistics appliance according to claim 1 wherein said radio link controller and radio subsystem controls signal strength to communicate with a merchant sales register to minimize the possibility of transmission interception during a purchase transaction.

9. The portable 2-way secure purchasing aid logistics appliance according to claim 1 wherein said central processor further includes executable software to compare smart card information and user personal identification number to data stored in a smart card and said central processor to prevent unauthorized use of said portable 2-way secure PAL, wherein said data stored on the smart card is read from said smart card reader integrated with said PAL.

10. The portable 2-way secure purchasing aid logistics appliance according to claim 1 wherein said encrypted RAM comprises:

an address decoder;

means for misaligning an address of a memory, location by a random number incorporated into said address decoder to encrypt the address; and means for accessing said memory location by said address decoder by using said random number when a secure address range is accessed when said encrypted RAM is in said secure mode.

11. A method for using a purchasing aid logistics appliance, comprising the steps of:
  downloading product data from a web site;
  creating a shopping list from the product data;
  monitoring beacon channels from a barker beacon at a threshold of a merchant facility;
  receiving into the purchasing aid logistics appliance a channel indication of a first wireless channel from the beacon channels;
  determining a location of the purchasing aid logistics appliance when the purchasing aid logistics appliance is in the threshold the merchant facility;
  causing the purchasing aid logistics appliance to wirelessly upload the shopping list to a merchant computer from the purchasing aid logistics appliance through the first wireless channel when the purchasing aid logistics appliance is in the threshold, the first wireless channel directly connecting the merchant computer with the purchasing aid logistics appliance;
  receiving the product data, a full duplex channel, and personal data into the purchasing aid logistics appliance from the merchant computer through the first wireless channel while traversing the threshold into the merchant facility;
  receiving a customer-specific merchant in-store identification and merchant-specific database identification into the purchasing aid logistics appliance from the merchant computer, the merchant-specific database identification being used in the purchasing aid logistics appliance to retrieve a merchant database pointer to be provided to the merchant computer to set customer treatment rules and retrieve merchant-specific product prices specific to the merchant facility;
  continually exchanging performance and error information between the purchasing aid logistics appliance and the merchant computer to enable the purchasing aid logistics appliance to increase transmit power if necessary; releasing the first wireless channel when the purchasing aid logistics appliance is out of range of the barker beacon;
  communicating with the merchant computer by means of the full duplex channel;
  responding to a periodic communication from the merchant computer with the customer-specific merchant in-store identification;
  processing voice input to summon customer assistance;
  scanning a product bar code when a product is placed in a shopping cart;
  creating a shopping cart file when the product is scanned;
  extracting, from the scanned bar code, numerical codes related to a web page representation;
  decoding said numerical codes according to merchant-specific rules and providing the decoded numerical codes to a parser that creates web page software to build a web page representation;
  supplying the product bar code and the merchant database pointer to the merchant computer;
  receiving the merchant-specific product prices from the merchant computer;
  tracking an amount of time is spent at a particular shopping location within the merchant facility;
  informing a user when a cost computed from the merchant-specific product prices as applied to the product selected by the user reaches a predetermined budget limit;
  wirelessly transmitting the shopping cart file to the merchant computer to checkout through a special-purpose link; and
  automatically uploading rebate information to the merchant computer.

12. The method as defined in claim 11 further comprising the steps of:
  recording financial transaction logs in parallel with banks and other financial organizations.

* * * * *